(12) United States Patent
Shen et al.

(10) Patent No.: US 8,755,806 B2
(45) Date of Patent: Jun. 17, 2014

(54) TRANSMISSION OF FEEDBACK INFORMATION ON PUSCH IN WIRELESS NETWORKS

(75) Inventors: Zukang Shen, Richardson, TX (US); Eko Nugroho Onggosanusi, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 849 days.

(21) Appl. No.: 12/366,047

(22) Filed: Feb. 5, 2009

(65) Prior Publication Data

US 2009/0203383 A1 Aug. 13, 2009

Related U.S. Application Data

(60) Provisional application No. 61/027,320, filed on Feb. 8, 2008.

(51) Int. Cl.
 *H04W 72/00* (2009.01)
 *H04W 4/00* (2009.01)
(52) U.S. Cl.
 USPC .......................................... 455/450; 370/329
(58) Field of Classification Search
 CPC ................................................... H04W 72/04
 See application file for complete search history.

(56) References Cited

U.S. PATENT DOCUMENTS

| | | | |
|---|---|---|---|
| 2006/0276212 A1* | 12/2006 | Sampath et al. | 455/513 |
| 2008/0311919 A1* | 12/2008 | Whinnett et al. | 455/447 |
| 2009/0060010 A1* | 3/2009 | Maheshwari et al. | 375/211 |
| 2010/0113057 A1* | 5/2010 | Englund et al. | 455/452.1 |

OTHER PUBLICATIONS

3GPP, "3rd Generation Partnership Project; Technical Specification Group Radio Access Network; Evolved Universal Terrestrial Radio Access (E-UTRA); Physical Channels and Modulation", 3GPP TS 36.211, Release 8, V8.4.0, Valbonne, France, Sep. 2008, pp. 1-80.

* cited by examiner

*Primary Examiner* — Huy C Ho
(74) *Attorney, Agent, or Firm* — Ronald O. Neerings; Wade James Brady; Frederick J. Telecky, Jr.

(57) ABSTRACT

A transmission of feedback information from a secondary to a primary node occurs in a plurality of N logical time durations. The secondary node receives an allocation of resources comprising a plurality of resource elements on an uplink shared data channel. The secondary node generates feedback information in response to transmissions from the primary node and normally transmits feedback information to the primary node on a control channel. On occasion, the secondary node receives a trigger from the primary node. In response to the trigger, the secondary node transmits the feedback information using a subset of the allocated resource elements on the uplink shared data channel.

18 Claims, 6 Drawing Sheets

TRANSMISSION OF FEEDBACK INFORMATION ON PUSCH IN WIRELESS NETWORKS

CLAIM OF PRIORITY UNDER 35 U.S.C. 119(e)

The present application claims priority to and incorporates by reference U.S. Provisional Application No. 61/027,320, filed Feb. 8, 2008, entitled "Simultaneous ACK/NAK and CQI Transmission on PUSCH."

FIELD OF THE INVENTION

This invention generally relates to wireless cellular communication, and in particular to transmission of feedback information in orthogonal frequency division multiple access (OFDMA), DFT-spread OFDMA, and single carrier frequency division multiple access (SC-FDMA) systems.

BACKGROUND OF THE INVENTION

Wireless cellular communication networks incorporate a number of mobile UEs and a number of NodeBs. A NodeB is generally a fixed station, and may also be called a base transceiver system (BTS), an access point (AP), a base station (BS), or some other equivalent terminology. As improvements of networks are made, the NodeB functionality evolves, so a NodeB is sometimes also referred to as an evolved NodeB (eNB). In general, NodeB hardware, when deployed, is fixed and stationary, while the UE hardware is portable.

In contrast to NodeB, the mobile UE can comprise portable hardware. User equipment (UE), also commonly referred to as a terminal or a mobile station, may be fixed or mobile device and may be a wireless device, a cellular phone, a personal digital assistant (PDA), a wireless modem card, and so on. Uplink communication (UL) refers to a communication from the mobile UE to the NodeB, whereas downlink (DL) refers to communication from the NodeB to the mobile UE. Each NodeB contains radio frequency transmitter(s) and the receiver(s) used to communicate directly with the mobiles, which move freely around it. Similarly, each mobile UE contains radio frequency transmitter(s) and the receiver(s) used to communicate directly with the NodeB. In cellular networks, the mobiles cannot communicate directly with each other but have to communicate with the NodeB.

Control information bits are transmitted, for example, in the uplink (UL), for several purposes. For instance, Downlink Hybrid Automatic Repeat ReQuest (HARQ) requires at least one bit of ACK/NACK transmitted in the uplink, indicating successful or failed circular redundancy check(s) (CRC). Moreover, a one bit scheduling request indicator (SRI) is transmitted in uplink, when UE has new data arrival for transmission in uplink. Furthermore, an indicator of downlink channel quality (CQI) needs to be transmitted in the uplink to support mobile UE scheduling in the downlink. While CQI may be transmitted based on a periodic or triggered mechanism, the ACK/NACK needs to be transmitted in a timely manner to support the HARQ operation. Note that ACK/NACK is sometimes denoted as ACKNAK or just simply ACK, or any other equivalent term. As seen from this example, some elements of the control information should be provided additional protection, when compared with other information. For instance, the ACK/NACK information is typically required to be highly reliable in order to support an appropriate and accurate HARQ operation. This uplink control information is typically transmitted using the physical uplink control channel (PUCCH), as defined by the 3GPP working groups (WG), for evolved universal terrestrial radio access (EUTRA). The EUTRA is sometimes also referred to as 3GPP long-term evolution (3GPP LTE). The structure of the PUCCH is designed to provide sufficiently high transmission reliability.

In addition to PUCCH, the EUTRA standard also defines a physical uplink shared channel (PUSCH), intended for transmission of uplink user data. The Physical Uplink Shared Channel (PUSCH) can be dynamically scheduled. This means that time-frequency resources of PUSCH are re-allocated every sub-frame. This (re)allocation is communicated to the mobile UE using the Physical Downlink Control Channel (PDCCH). Alternatively, resources of the PUSCH can be allocated semi-statically, via the mechanism of semi-persistent scheduling. Thus, any given time-frequency PUSCH resource can possibly be used by any mobile UE, depending on the scheduler allocation. Physical Uplink Control Channel (PUCCH) is different than the PUSCH, and the PUCCH is used for transmission of uplink control information (UCI). Frequency resources which are allocated for PUCCH are found at the two extreme edges of the uplink frequency spectrum. In contrast, frequency resources which are used for PUSCH are in between. Since PUSCH is designed for transmission of user data, re-transmissions are possible, and PUSCH is expected to be generally scheduled with less stand-alone sub-frame reliability than PUCCH. The general operations of the physical channels are described in the EUTRA specifications, for example: "3$^{rd}$ Generation Partnership Project; Technical Specification Group Radio Access Network; Evolved Universal Terrestrial Radio Access (E-UTRA); Physical Channels and Modulation (Release 8)." (3GPP TS 36.211)

A reference signal (RS) is a pre-defined signal, pre-known to both transmitter and receiver. The RS can generally be thought of as deterministic from the perspective of both transmitter and receiver. The RS is typically transmitted in order for the receiver to estimate the signal propagation medium. This process is also known as "channel estimation." Thus, an RS can be transmitted to facilitate channel estimation. Upon deriving channel estimates, these estimates are used for demodulation of transmitted information. This type of RS is sometimes referred to as De-Modulation RS or DM RS. Note that RS can also be transmitted for other purposes, such as channel sounding (SRS), synchronization, or any other purpose. Also note that Reference Signal (RS) can be sometimes called the pilot signal, or the training signal, or any other equivalent term.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

ACK/NAK transmission is critical in support of hybrid ARQ (HARQ). In some cases, ACK/NAK and CQI may be transmitted together in one subframe. Typically, transmission of simultaneous ACK/NAK and CQI can be done on PUCCH (which is the uplink control channel in 3GPP LTE). Alternatively, a NodeB can send a trigger to a UE via an uplink grant to send CQI and ACK/NAK together on PUSCH, which is the uplink data channel in 3GPP LTE.

In other words, the NodeB can reroute simultaneous ACK/NAK and CQI report on PUCCH to aperiodic ACK/NAK and CQI reporting on PUSCH. The UE will then respond accordingly by sending a CQI and ACK/NAK report via the allocated resource on PUSCH. The CQI and ACK/NAK report can be alone or multiplexed with uplink data from that particular UE. The timing offset between the NodeB transmission of the trigger and the UE report is fixed according to a specified timing offset between a specified UL grant transmission and a UE response of a PUSCH transmission. For LTE, the offset is specified to be four sub-frames.

Figure 1:
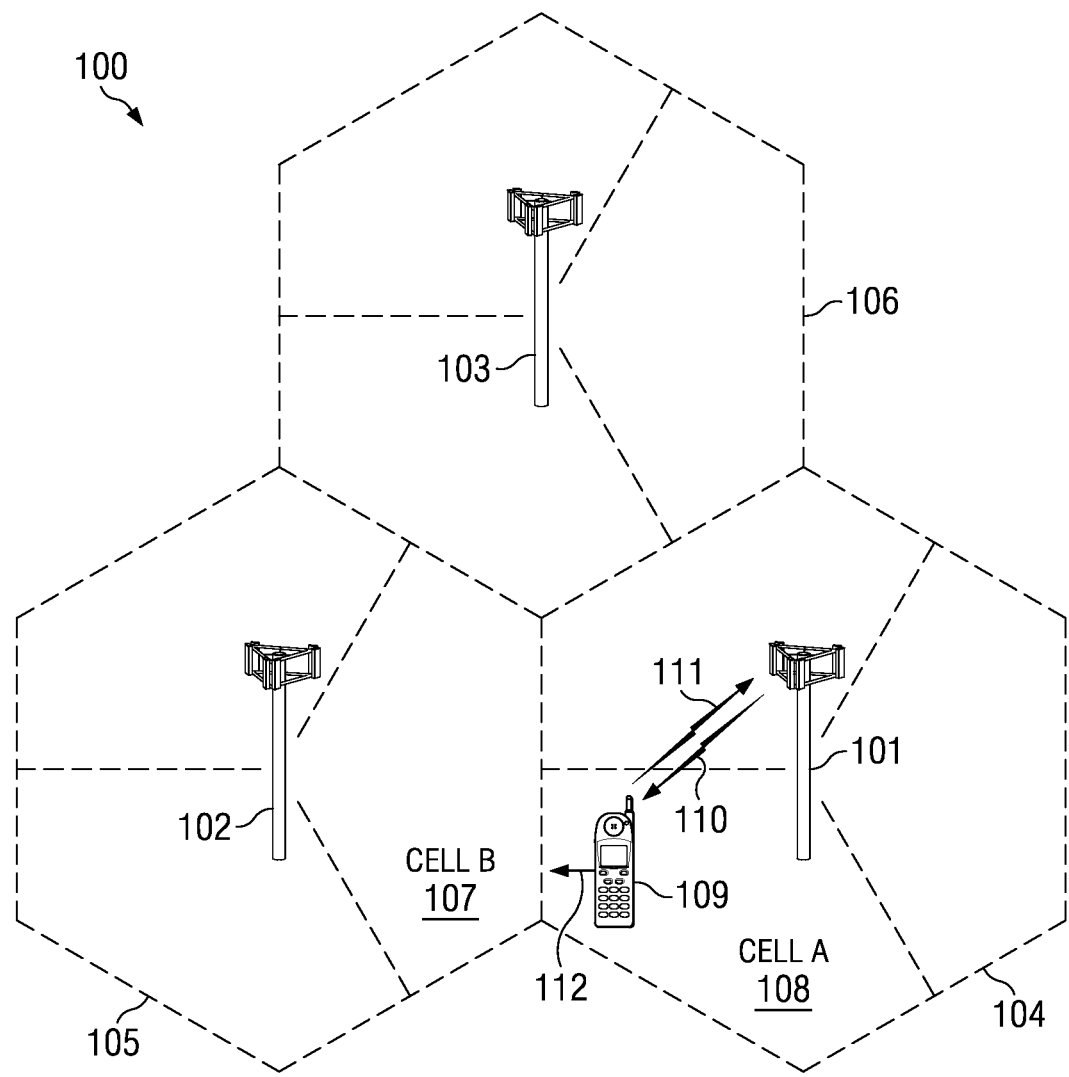
FIG. 1 is a pictorial of an illustrative telecommunications network that employs aperiodic rerouting of ACKNAK and/or CQI from PUCCH to PUSCH.

FIG. 1 shows an exemplary wireless telecommunications network 100. The illustrative telecommunications network includes representative base stations 101, 102, and 103; however, a telecommunications network necessarily includes many more base stations. Each of base stations 101, 102, and 103 are operable over corresponding coverage areas 104, 105, and 106. Each base station's coverage area is further divided into cells. In the illustrated network, each base station's coverage area is divided into three cells. Handset or other UE 109 is shown in Cell A 108, which is within coverage area 104 of base station 101. Base station 101 is transmitting to and receiving transmissions from UE 109 via downlink 110 and uplink 111. As UE 109 moves out of Cell A 108, and into Cell B 107, UE 109 may be handed over to base station 102. Because UE 109 is synchronized with base station 101, UE 109 must employ non-synchronized random access to initiate handover to base station 102. A UE in a cell may be stationary such as within a home or office, or may be moving while a user is walking or riding in a vehicle. UE 109 moves within cell 108 with a velocity 112 relative to base station 102.

UE 109 uses an embodiment of a NodeB directed scheme to reroute CQI and/or ACKNAK from the PUCCH to the PUSCH. This scheme will be described in more detail below for ACKNAK and/or CQI on PUSCH to the serving NodeB, such as NodeB 101 while UE 109 is within cell 108.

Figure 2:
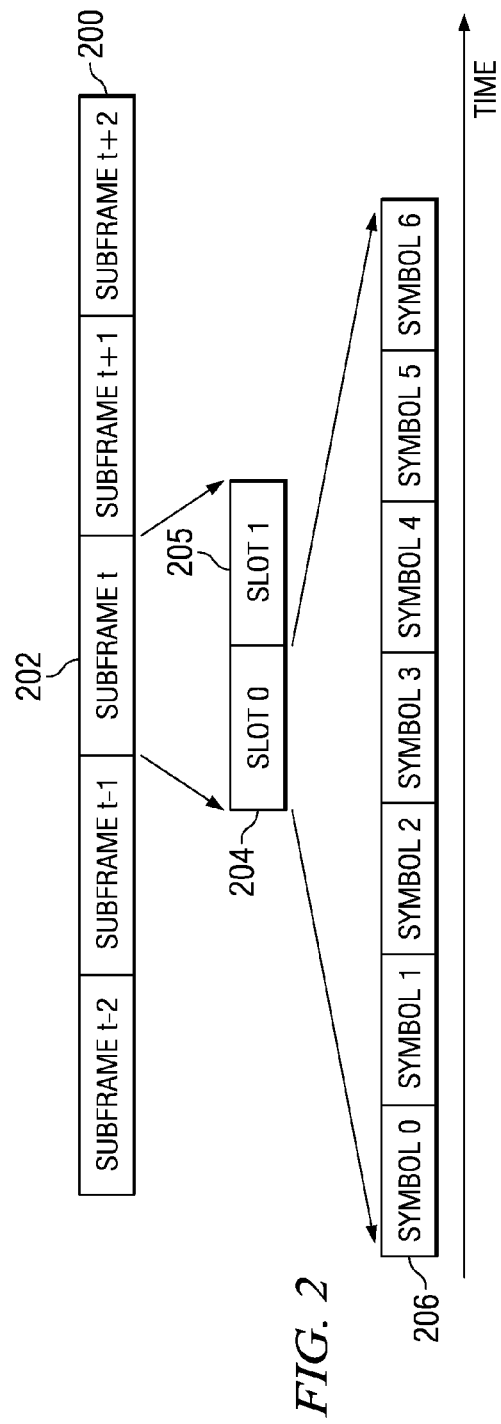
FIG. 2 illustrates an example frame structure of FIG. 1.

FIG. 2 is an example frame structure 200 used in FIG. 1. Each frame 200 contains several subframes, as indicated generally at 202. In turn, subframe 202 contains two slots 204, 205. Each slot contains a number of information carrying symbols, generally indicated at 206. A cyclic prefix (CP) field is also appended to each symbol in order to improve reception integrity. In the current E-UTRA standard, each slot contains seven symbols 206 if a normal CP length is used or six symbols 206 if an extended CP length is used. Other embodiments of the invention may provide other frame structures than the exemplary frame structure illustrated in FIG. 2.

For PUCCH, a cyclically shifted or phrase ramped CAZAC-like sequence is transmitted in each symbol. Different cyclic shifts or different amounts of phrase ramping can be used to multiplex more than one UEs' PUCCH transmission in the same physical resource block. A resource block in 3GPP E-UTRA is defined as 12 consecutive resource elements in frequency domain, wherein each resource element is of 15 kHz. Therefore, at most 12 CQI UEs can be multiplexed in the same PUCCH resource block. For CQI transmission on PUCCH, with QPSK modulation, 20 coded CQI bits are available per UE within one sub-frame. For ACK/NAK transmission, additional orthogonal covering can be applied across the symbols in the time domain, thereby increasing the ACK/NAK multiplexing up to 36 UEs per PUCCH resource block. However, due to spillover between consecutive cyclic shifts, it is recommended that not all 12 cyclic shifts are utilized.

In each OFDM symbol, a cyclically shifted or phase ramped CAZAC-like sequence is transmitted. The CAZAC-like sequence in a RS OFDM symbol is un-modulated. The CAZAC-like sequence in a data OFDM symbol is modulated by the data symbol. Here the data symbol can be the ACK/NAK symbol, scheduling request indicator (SRI) symbol, Rank Indicator (RI) symbol, or CQI symbol. In this disclosure, a CAZAC-like sequence generally refers to any sequence that has the property of constant amplitude zero auto correlation. Examples of CAZAC-like sequences includes but not limited to, Chu Sequences, Frank-Zadoff Sequences, Zadoff-Chu (ZC) Sequences, Generalized Chirp-Like (GCL) Sequences, or any computer generated CAZAC sequences. One example of a CAZAC-like sequence $\bar{r}_{u,v}(n)$ is given by $$\bar{r}_{u,v}(n) = e^{j\phi(n)\pi/4}, \quad 0 \le n \le M_{SC}^{RS} - 1$$

where $M_{SC}^{RS} = 12$ and $\phi(n)$ is defined in Table 1.

In this disclosure, the cyclically shifted or phase ramped CAZAC-like sequence is sometimes denoted as cyclic shifted base sequence, cyclic shifted root sequence, phase ramped base sequence, phase ramped root sequence, or any other equivalent term.

TABLE 1

Definition of $\phi(n)$

| u | $\phi(0), \ldots, \phi(11)$ | | | | | | | | | | |
|---|---|---|---|---|---|---|---|---|---|---|---|
| 0 | -1 | 1 | 3 | -3 | 3 | 3 | 1 | 1 | 3 | 1 | -3 | 3 |
| 1 | 1 | 1 | 3 | 3 | 3 | -1 | 1 | -3 | -3 | 1 | -3 | 3 |
| 2 | 1 | 1 | -3 | -3 | -3 | -1 | -3 | -3 | 1 | -3 | 1 | -1 |
| 3 | -1 | 1 | 1 | 1 | 1 | -1 | -3 | -3 | 1 | -3 | 3 | -1 |
| 4 | -1 | 3 | 1 | -1 | 1 | -1 | -3 | -1 | 1 | -1 | 1 | 3 |
| 5 | 1 | -3 | 3 | -1 | -1 | 1 | 1 | -1 | -1 | 3 | -3 | 1 |
| 6 | -1 | 3 | -3 | -3 | -3 | 3 | 1 | -1 | 3 | 3 | -3 | 1 |
| 7 | -3 | -1 | -1 | -1 | 1 | -3 | 3 | -1 | 1 | -3 | 3 | 1 |
| 8 | 1 | -3 | 3 | 1 | -1 | -1 | -1 | 1 | 1 | 3 | -1 | 1 |
| 9 | 1 | -3 | -1 | 3 | 3 | -1 | -3 | 1 | 1 | 1 | 1 | 1 |
| 10 | -1 | 3 | -1 | 1 | 1 | -3 | -3 | -1 | -3 | -3 | 3 | -1 |
| 11 | 3 | 1 | -1 | -1 | 3 | 3 | -3 | 1 | 3 | 1 | 3 | 3 |
| 12 | 1 | -3 | 1 | 1 | -3 | 1 | 1 | 1 | -3 | -3 | -3 | 1 |
| 13 | 3 | 3 | -3 | 3 | -3 | 1 | 1 | 3 | -1 | -3 | 3 | 3 |
| 14 | -3 | 1 | -1 | -3 | -1 | 3 | 1 | 3 | 3 | 3 | -1 | 1 |
| 15 | 3 | -1 | 1 | -3 | -1 | -1 | 1 | 1 | 3 | 1 | -1 | -3 |
| 16 | 1 | 3 | 1 | -1 | 1 | 3 | 3 | 3 | -1 | -1 | 3 | -1 |
| 17 | -3 | 1 | 1 | 3 | -3 | 3 | -3 | -3 | 3 | 1 | 3 | -1 |
| 18 | -3 | 3 | 1 | 1 | -3 | 1 | -3 | -3 | -1 | -1 | 1 | -3 |
| 19 | -1 | 3 | 1 | 3 | 1 | -1 | -1 | 3 | -3 | -1 | -3 | -1 |
| 20 | -1 | -3 | 1 | 1 | 1 | 1 | 3 | 1 | -1 | 1 | -3 | -1 |
| 21 | -1 | 3 | -1 | 1 | -3 | -3 | -3 | -3 | -3 | 1 | -1 | -3 |
| 22 | 1 | 1 | -3 | -3 | -3 | -3 | -1 | 3 | -3 | 1 | -3 | 3 |
| 23 | 1 | 1 | -1 | -3 | -1 | -3 | 1 | -1 | 1 | 3 | -1 | 1 |
| 24 | 1 | 1 | 3 | 1 | 3 | 3 | -1 | 1 | -1 | -3 | -3 | 1 |
| 25 | 1 | -3 | 3 | 3 | 1 | 3 | 3 | 1 | -3 | -1 | -1 | 3 |
| 26 | 1 | 3 | -3 | -3 | 3 | -3 | 1 | -1 | -1 | 3 | -1 | -3 |
| 27 | -3 | -1 | -3 | -1 | -3 | 3 | 1 | -1 | 1 | 3 | -3 | -3 |

TABLE 1-continued

Definition of φ(n)

| u | φ(0), . . . , φ(11) | | | | | | | | | | | |
|---|---|---|---|---|---|---|---|---|---|---|---|---|
| 28 | −1 | 3 | −3 | 3 | −1 | 3 | 3 | −3 | 3 | 3 | −1 | −1 |
| 29 | 3 | −3 | −3 | −1 | −1 | −3 | −1 | 3 | −3 | 3 | 1 | −1 |

The frame structure used in the PUSCH is similar to that illustrated in FIG. 2. Each resource block (RB) in PUSCH contains twelve resource elements, each of which covers a 15 kHz portion of the frequency spectrum. However, Code Division Multiplexing (CDM) is not employed in the PUSCH.

Figure 3:
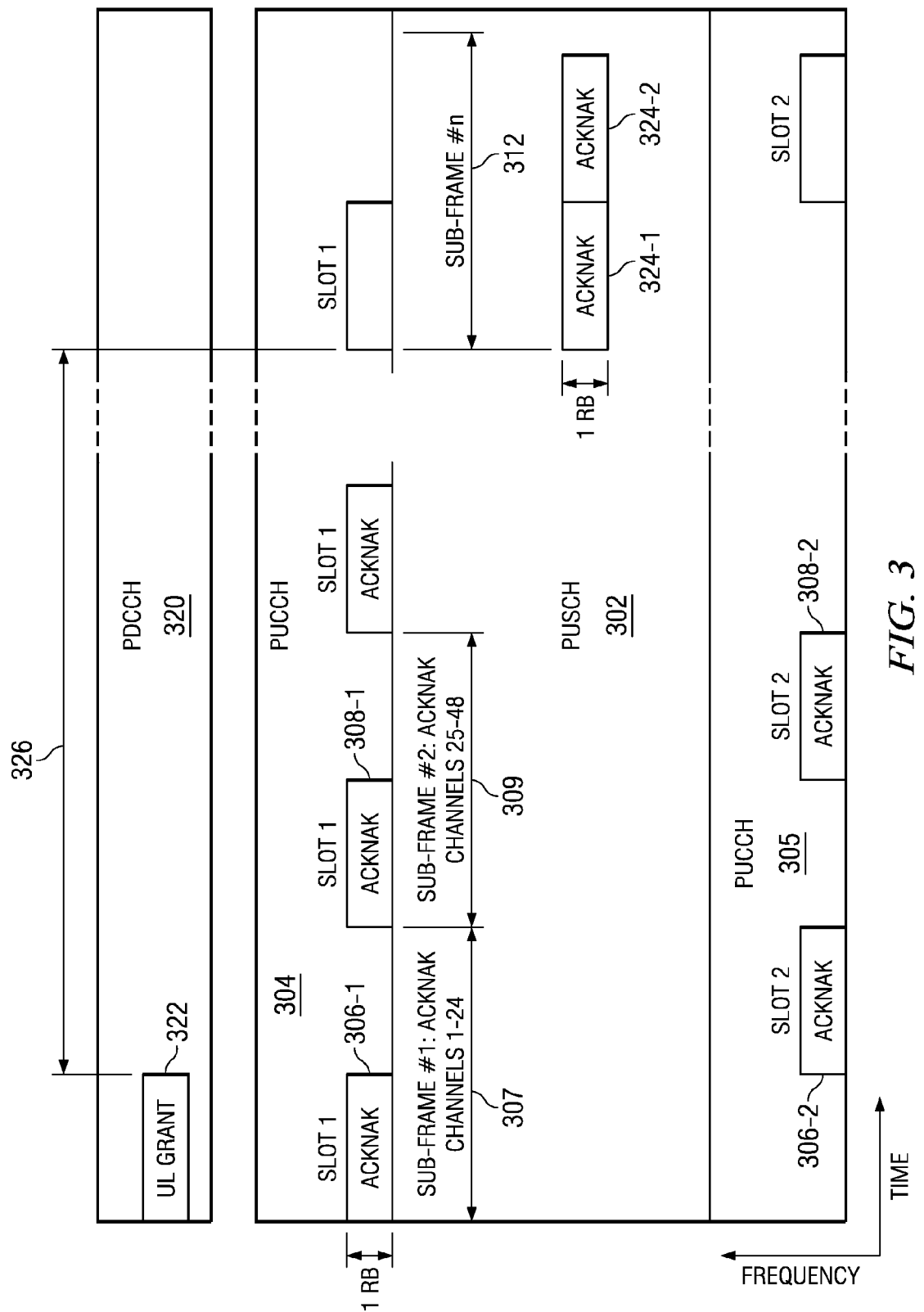
FIG. 3 is an illustration of rerouting ACKNAK from PUSCH to PUCCH.

FIG. 3 is frequency vs. time plot illustrating PUCCH 304, 305 and PUSCH 302, with ACKNAK transmitted on the PUCCH using a cyclic shifted or phrase ramped CAZAC-like sequence. Each ACK/NAK channel can be defined as a combination of a cyclic shifted or phrase ramped CAZAC-like sequence, and an orthogonal covering sequence. The ACK-NAK channels are continuously allocated on one or more resource blocks of the physical uplink control channel (PUCCH). FIG. 3 shows an example where at most twenty-four ACK/NAK channels can be multiplexed in one PUCCH RB, as indicated generally at 307. The next sequential subframe is indicated at 308 and can likewise support up to twenty-four ACK/NAK channels. Within a sub-frame, the PUCCH resource used for ACK/NAK transmission hops at both edges of the system bandwidth on a slot basis. Each slot represents one-half of a subframe. For example, an ACKNAK transmission in slot 306-1 of subframe 307 is in the higher frequency edge 304 and the ACKNAK transmission is repeated in slot 306-2 of subframe 307 which is in the lower frequency edge 305 of the PUCCH. Similarly, slots 308-1, 308-2 carry the next set of twenty-four ACK/NAK channels in subframe 309. In general, the first and second slot ACK-NAK sequences are the same, but they may be different in some embodiments. Note that although FIG. 3 shows an example where a maximum of 24 ACK/NAK channels exist in one PUCCH resource block in a subframe, the number of UEs transmitting ACK/NAK in the PUCCH RB can be less than 24, since typically not all ACK/NAK channels are used in a subframe.

Occasionally, the NodeB that is serving a particular UE may determine that transmissions of ACKNAK signals from that UE are being interfered with by other UEs in the same cell, or in the neighboring cells, or by other factors. Since CDM is employed in the PUCCH, due to intra-cell interference, a signal from a UE that is at the edge of the cell may be over-powered by other UE that are being multiplexed onto the same resource block but that are closer to the NodeB. Loss of ACKNAK signal quality may also be due to concurrent transmission of CQI by the same UE, wherein a portion of the transmit power is consumed by CQI transmission. In any of these cases, the NodeB may send a trigger signal to direct the affected UE to reroute its ACKNAK and possibly also its CQI feedback transmissions to the PUSCH. Since each channel in the PUSCH is used by only one UE at a time, the interference can be overcome in this manner.

Referring again to FIG. 3, uplink grant 322 may be interpreted as a trigger signal to cause a particular UE that received uplink grant 322 to reroute its ACKNAK and/or CQI response 324-1, 324-2 to the PUSCH on a particular channel or channels of a particular resource block that is allocated by uplink grant 322. The UE will transmit the ACKNAK and/or CQI using the allocated PUSCH resources by uplink grant 322 in a subframe, which occurs a defined amount of time 326 after the trigger signal is received. In this embodiment, the delay time is four subframe time periods. In another embodiment, some filed(s) in the UL grant can be the trigger to indicate whether UE shall transmit CQI and/or ACK/NAK on the allocated PUSCH resources.

Figure 4:
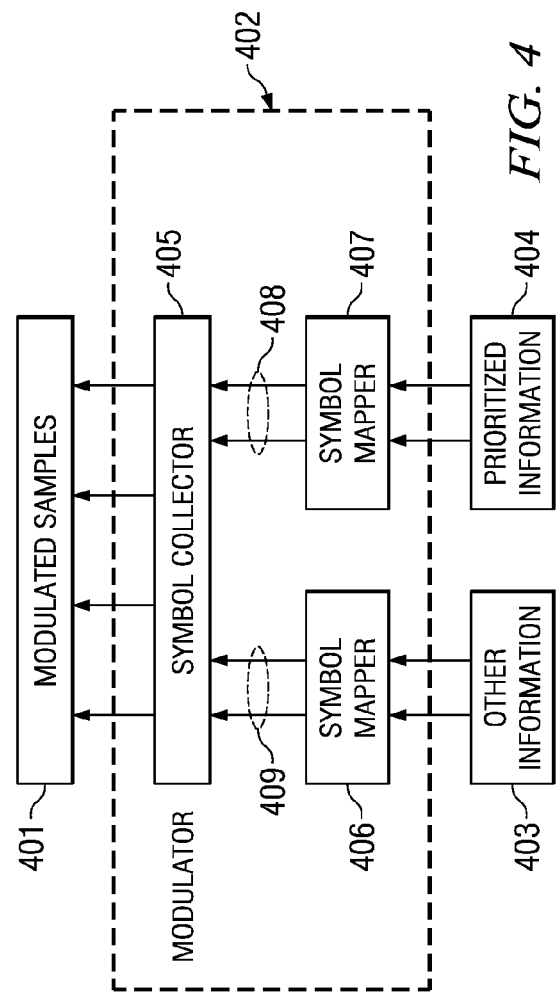
FIG. 4 is a block diagram of a modulator for forming ACKNAK in a symbol for transmission on PUSCH.

FIG. 4 is a block diagram illustrating a possible embodiment of a modulator 402 for data and feedback information. In 402, Other Information (OI) 403 is mapped to complex samples 409 using Symbol Mapper 406, while Prioritized Information (PI) 404 is mapped to complex samples 408 using Symbol Mapper 407. OI may be general data that is to be transmitted on the PUSCH. PI may be ACKNAK feedback information and/or CQI feedback information that is being rerouted to the PUSCH in response to a trigger signal form the serving NodeB. Symbol Mappers 406 and 407 can be simple BPSK, QPSK, 8-PSK, 16 QAM, 64 QAM, sequence modulation, or any other digital modulation techniques. Collection of complex samples from 408 and 409 is performed using Symbol Collector 405. In some embodiments, the Symbol Collector 405 is used to simply multiplex the Mapped Priority Information 408 and Mapped Other Information 409. This multiplexing can be performed in a number of different conventions. For example, in some embodiments, Symbol Collector 405 can simply append the Mapped Priority Information 408 at the end of the Mapped Other Information 409. In other embodiments, Symbol Collector 405 can simply append the Mapped Other Information 409 at the end of the Mapped Priority Information 408. In other embodiments, Symbol Collector 405 can simply interlace the Mapped Other Information 409 and the Mapped Priority Information 408. Note that other operations of a Symbol Collector 405, according to some pre-arranged convention are not precluded. Thus in FIG. 4, the Mapped Other Information 409 and the Mapped Priority Information 408 are Collected using the Symbol Collector 405 to produce Modulated Samples 401.

Figure 5:
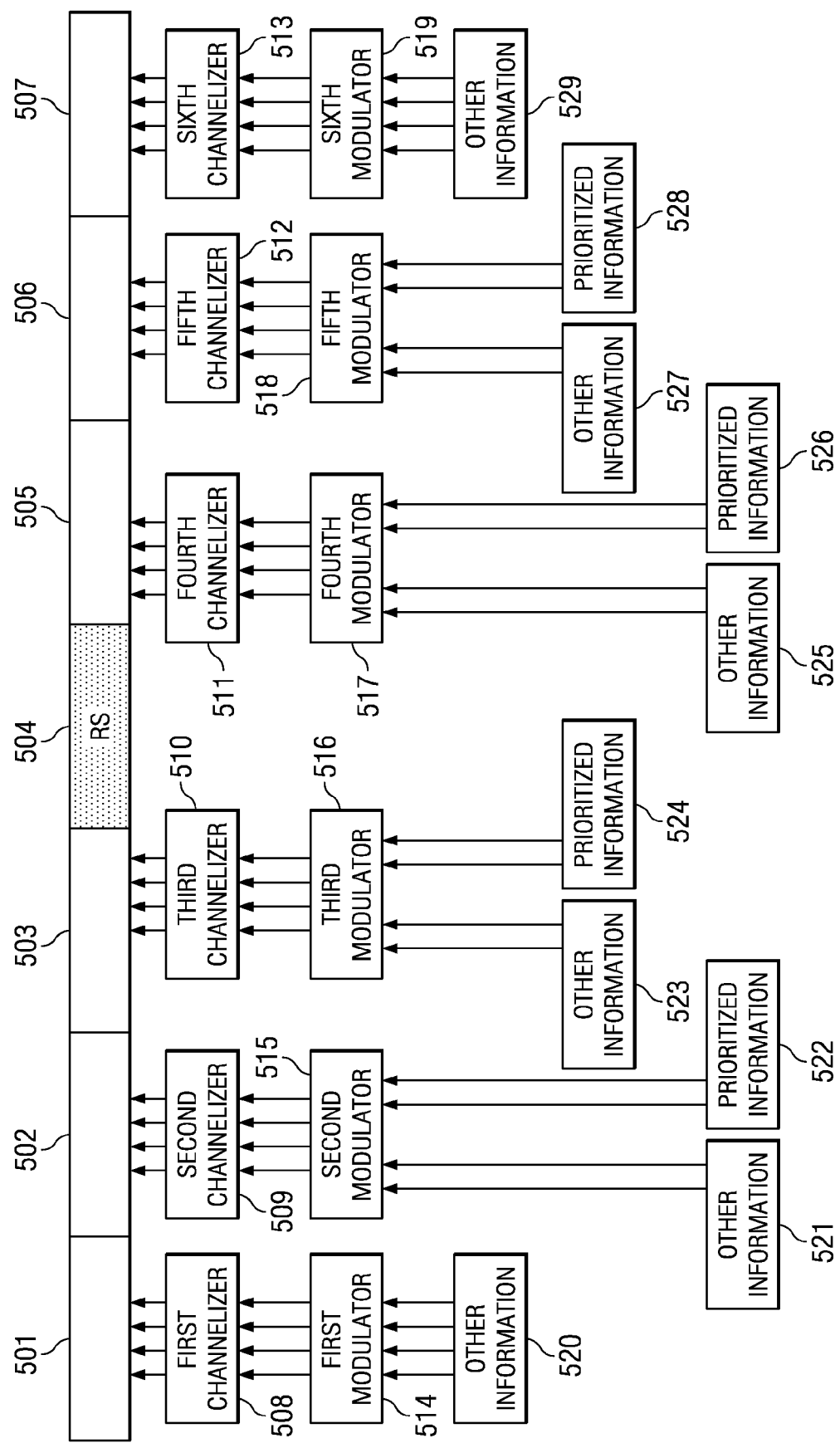
FIG. 5 is a illustrative block diagram of circuitry for forming a PUSCH transmission slot, using the slot structure of FIG. 2.

FIG. 5 shows a PUSCH transmission slot in accordance with an embodiment of the invention. In FIG. 5, the slot is the PUSCH 3GPP EUTRA slot, with a described timing structure as described in FIGS. 2-3. Note that in FIG. 5, Prioritized Information 522 is carried on baseband signal 502; Prioritized Information 524 is carried on baseband signal 503; Prioritized Information 526 is carried on baseband signal 505; Prioritized Information 528 is carried on baseband signal 506. Since baseband signal 503 and 504 surround baseband RS signal in 504, the Prioritized Information 524 and 526 is given protection in high-mobility environments. In addition, since signals 502 and 506 are baseband signals which are second-adjacent to the RS in 504, the Prioritized Information 522 and 528 is given certain protection in high-mobility environments. Second Modulator 515 is used to modulate together both Other Information 521 and the Prioritized Information 522. Third Modulator 516 is used to modulate together both Other Information 523 and the Prioritized Information 524. Fourth Modulator 517 is used to Modulate together both Other Information 525 and the Prioritized Information 526. Fifth Modulator 518 is used to Modulate together both Other Information 527 and the Prioritized Information 528. A Possible embodiment of modulators 515, 516, 517 and 518 is shown by 402 of FIG. 4.

In FIG. 5, the Prioritized Information 522, 524, 526, 528 could be prior-encoded which means that all arrive from one channel encoder. In some embodiments, 522, 524, 526, 528 could even be identical. Similarly, Other Information 520, 521, 523, 525, 527 and 529 can also be prior encoded, where all arrive from one channel coder. Modulators 514 and 519 can be selected from BPSK, QPSK, 8-PSK, 16 QAM, 64 QAM, sequence modulation, or any other digital modulation techniques. This, however, is not mandatory. Channelizers 508, 509, 510, 511, 512, and 513 can be the described Channelizer 601 in FIG. 6. Note that other embodiments of Channelizers are possible, including variations of 601, such as removing the Transform Precoder. Note that, in FIG. 5, the Prioritized Information 524 is transmitted in the symbol 503, which is adjacent to the RS symbol 504. Similarly, the Prioritized Information 526 is transmitted in the symbol 505, which is adjacent to the RS symbol 504. In addition, note that Prioritized Information 522 is transmitted in the symbol 502, which is second-adjacent to the RS symbol, and Prioritized Information 528 is transmitted in the symbol 506, which is also second-adjacent to the RS symbol 504. This is tolerable since the second-adjacent symbol to the RS still maintains a substantial amount of channel coherence from the RS. Thus, in certain cases, it is possible to use the second-adjacent symbol to the RS. Thus, the FIG. 5 can represent a slot structure for joint transmission of Control Information and other Information on the physical uplink shared channel (PUSCH).

Note that, when Prioritized Information is transmitted in the PUSCH, certain samples (in the base-band) of the Other Information may have to be punctured, in order to provide space for Prioritized Information. This puncturing can be pre-arranged and according the 3GPP puncturing convention described in the specification. However, since Other Information can already be encoded, it is typically possible to infer the Other Information (as well) at the receiver.

Referring still to FIG. 5, as discussed earlier prioritized control information can be mapped surrounding the DM RS in decreasing order of priority. For instance, ACKNAK can be immediately surrounding the RS. Then, the next can be rank information, which is then surrounding the ACKNAK information, etc. In this case, ACKNAK information 524, 526 may be encoded with other information 523, 525 and then located in symbols 503 and 505 immediately adjacent DM RS symbol 504. Similarly, CQI information 522, 528 may be encoded with other information 521, 527 and then located in symbols 502 and 506 to thereby surround the ACKNAK symbols 503, 505 and DM RS symbol 504. Alternatively, ACKNAK information and CQI information may be encoded together then located in symbols 503 and 505. Alternatively, CQI information may be encoded alone or with other information and then located in symbols 503 and 505, for example.

Figure 6:
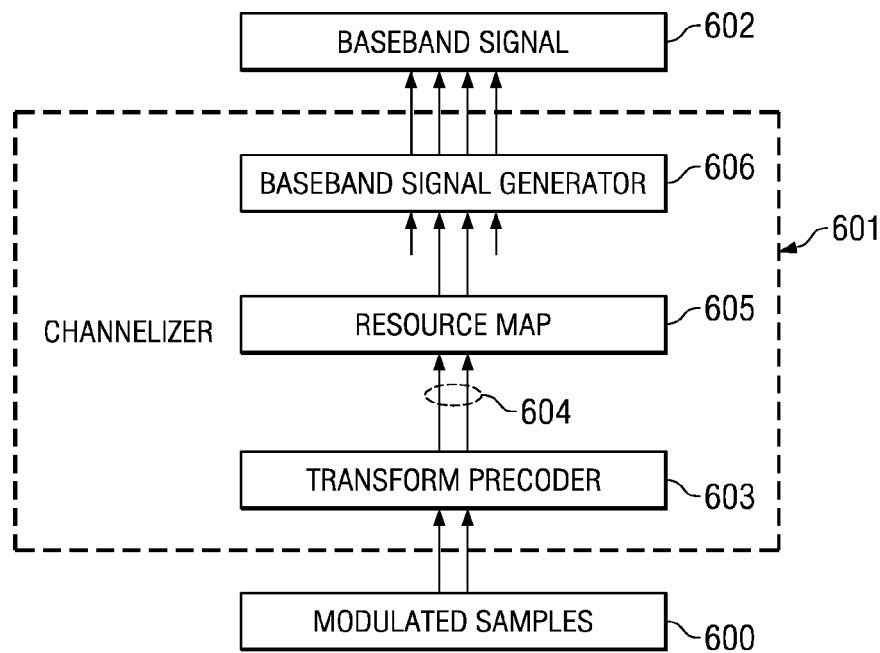
FIG. 6 is a block diagram of a Channelizer that forms a signal for transmission using the format of FIG. 2.

FIG. 6 is a block diagram which illustrates operation of a Channelizer 601 that can be used to form symbols of the sub-frame in FIG. 2 and FIG. 5. The Channelizer of FIG. 6 begins with complex modulated samples 600, such as modulated samples 401, that can belong to a constellation such as BPSK, QPSK, 8-PSK, 16 QAM, 64 QAM or some other constellations. This however, is not mandatory. Modulated samples 600 can be transformed by the Transform Pre-Coder 603. One example of the Transform Pre-Coder 603 is $$z[k]=\beta\Sigma_i d[i]\exp(-j2\pi ki/L),$$

where sum $\Sigma_i$ extends across all indexes "i" in $\{0, 1, \ldots, L-1\}$, where "j" is the complex unit, where $\pi$ is the well-known constant (approximately 3.14), where d[i] are symbols of the sequence 600 which enters the Transform Pre-Coder 603, where "L" is the length of both the sequence which enters (600) and the sequence which is outputted (604) by the Transform Pre-Coder 603, where D is a normalization constant (e.g. inverse square root of L). Note the "L" can be the number of tones allocated on PUSCH, for this particular mobile UE. In some embodiments, the Transform Pre-Coder 603 can be implemented using a Discrete Fourier Transform (DFT). Transform Pre-Coder 603 is coupled to the Resource Map 605, which describes the set of PUSCH tones which are allocated to the UE for the present sub-frame. Resource Map 605 is coupled with the Baseband Signal Generator 606. Thus, the Resource Map 605 maps said samples z[k] onto a[m], which is the input to the Baseband Signal Generator. Thus, in some embodiments, sequence of a[m] contains samples of the sequence z[k], along with some other possible samples (e.g. zero-insertion). One possible embodiment of the Baseband Signal Generator 606 is given by the formula $$s(t)=\Sigma_m a[m+c]\exp\ [j2\pi(m+\tfrac{1}{2})(t-N_{CP}T_s)\Delta f],$$

where the sum $\Sigma_m$ ranges over m. In accordance to the 3GPP specification TS36.211, as $T_s=1/(15000\times 2048)$ where "x" is just multiplication. Here, $\Delta f$ is 15 kHz. Here, $N_{CP}$ is the number of Cyclic Prefix (CP) samples, which can be transmitted for every symbol, as common in OFDM-based systems. Also note that $N_{CP}$ can be symbol—dependent. Here, t is the continuous-time variable whose range is as $0 \le t \le (N+N_{CP})T_s$ where N=2048. Here, sequence a[m+c] is assumed to have M non-zero elements. Here, c is just an offset, which can be equal, for example, to floor (M/2). In this case, the sum $\Sigma$ ranges over "m" inside the set $\{-\text{floor}(M/2), -\text{floor}(M/2)+1, \ldots, \text{ceil}(M/2)-1\}$, where floor is the known "floor" function and "ceil" is the known ceiling function. Note that "m+½" in the above sum performs a frequency offset of ½ tone, implemented in the baseband, for purpose of DC-offset mitigation of the Direct Conversion problem. Note that this is just an embodiment of the Baseband Signal Generator 606, and other embodiments, which different specific numbers are possible. Thus, different modifications to the Baseband Signal Generator 606 are possible, which don't affect the scope of the Present Invention. Components of the Baseband Signal Generator can be implemented using the Inverse Discrete Fourier Transform (IDFT).

Figure 7:
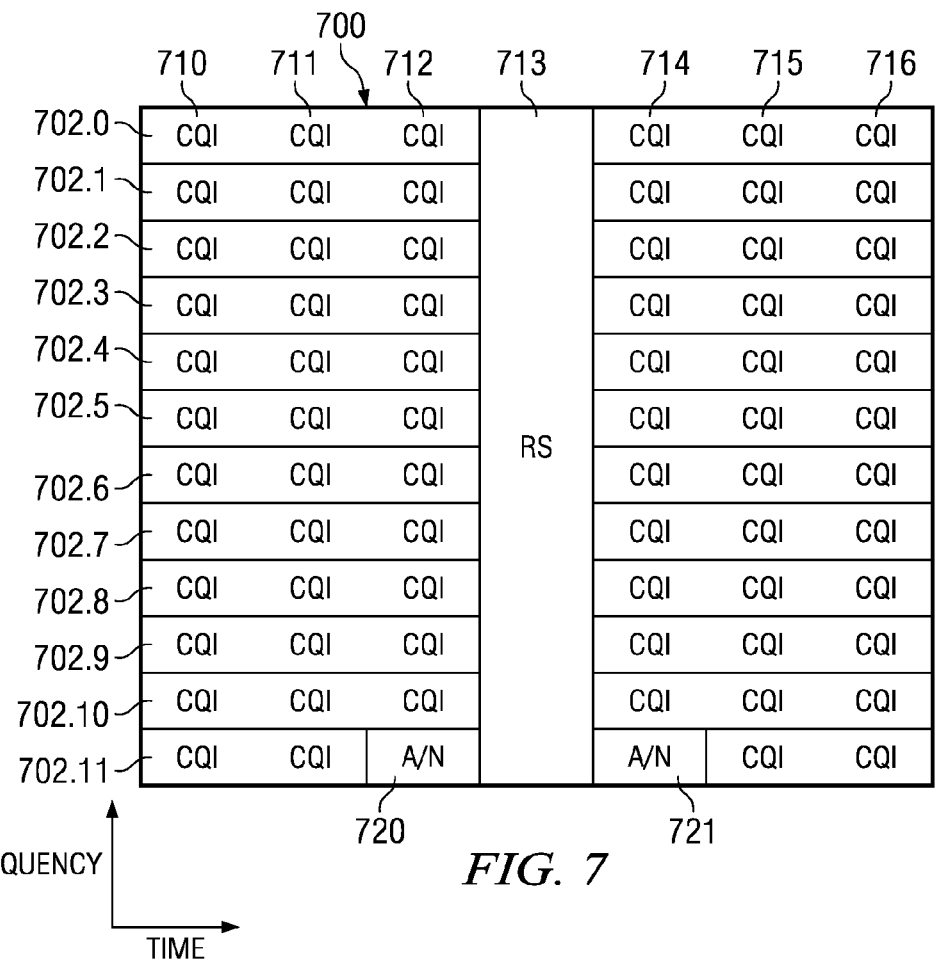
FIG. 7 is a illustration of one PUSCH resource block that is formed by the circuitry of FIG. 5.

FIG. 7 is an illustration of one resource block 700 that is formed by the circuitry of FIG. 5. In this embodiment, a resource block on PUSCH includes twelve resource elements 702.0-702.11 that each cover 15 khz of bandwidth and form a subframe as described in FIG. 2. In this example, seven symbols 710-716 are formed in one slot as described in FIG. 2. A common RS 713 spans all twelve resource elements. As discussed above with regard to FIG. 6, CQI and ACKNAK feedback information may be transmitted together in one symbol using the resources allocated to the one particular UE. For example, if the UE is allocated with one resource block, then the CQI may be transmitted on all resource elements 702.0-702.11. ACKNAK information 720, 721 may be inserted in one or more resource elements, such as channel 702.11 by puncturing one or more CQI symbols. In this example, two CQI symbols are punctured.

Figure 8:
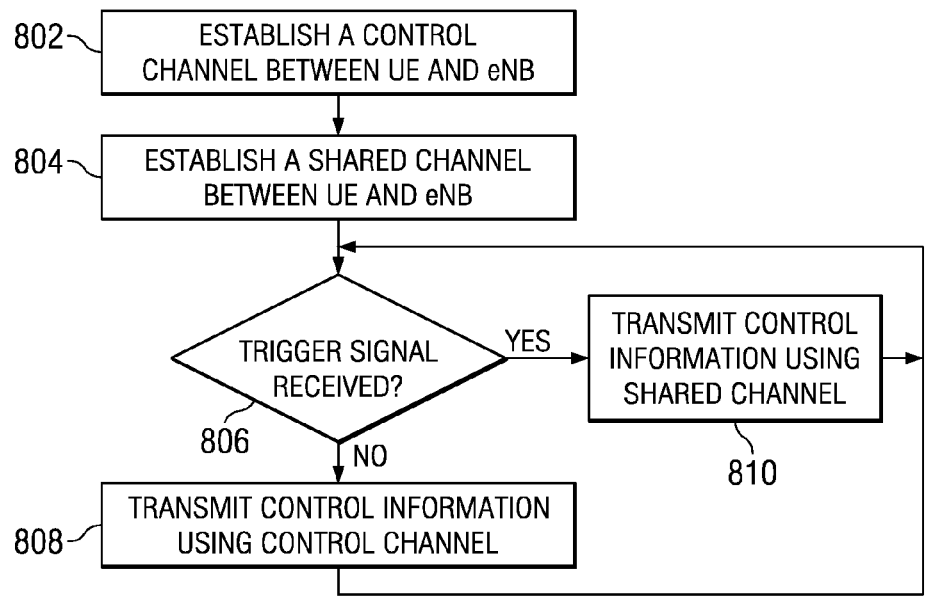
FIG. 8 is a flow diagram illustrating uplink transmission of feedback information in the network system of FIG. 1.

FIG. 8 is a flow diagram illustrating an embodiment of uplink transmission in the network of FIG. 1. Generally, when a UE first enters a cell, a physical uplink control channel (PUCCH) is established 802 between the UE and the eNB. The PUCCH resource can be established by explicit higher layer (e.g. RRC) signaling from eNodeB. A physical uplink shared channel (PUSCH) is also established 804. The Physical Uplink Shared Channel (PUSCH) can be dynamically scheduled. This means that time-frequency resources of PUSCH are re-allocated every sub-frame. This re-allocation is found in the Physical Downlink Control Channel (PDCCH). Alternatively, resources of the PUSCH can be allocated semi-statically, via the mechanism of semi-persistent scheduling. Thus, any given time-frequency PUSCH resource can possibly be used by any mobile UE, depending on the scheduler allocation. Physical Uplink Control Channel (PUCCH) is different than the PUSCH, and the PUCCH is used for transmission of uplink control information (UCI). Frequency resources which are allocated for PUCCH are found at the two extreme edges of the uplink spectrum. In contrast, frequency resources which are used for PUSCH are in between. Since PUSCH is designed for transmission of user data, re-transmissions are possible, and PUSCH is expected to be generally scheduled with less stand-alone sub-frame reliability than PUCCH.

In general, if data is not available for transmission 806 or if no PUSCH resource is allocated, then control information is transmitted 808 from the UE to the eNB using the PUCCH, as described earlier. However, if the serving NodeB determines that reception of ACKNAK and/or CQI is not adequate, then the NodeB may send a trigger signal 806 to the particular UE, such that the UE transmits 810 ACKNAK and/or CQI feedback using an allocated resource on PUSCH. This allocation is performed on a subframe by subframe basis.

At any given time, the UE uses only either the control channel (PUCCH) or the shared channel (PUSCH) for transmission of control information and data information. By only using one channel at any given time, peak-to-average power levels are maintained at lower levels.

The feedback information is produced in response to receiving an allocation of resources comprising a plurality of resource elements on a downlink shared data channel and then receiving a block of data transmitted on the allocated downlink shared data channel. The received data on the allocated downlink shared data channel is decoded and either a positive response (ACK) when the data is decoded correctly or a negative response (NAK) when the date is decoded incorrectly is generated as feedback information. The correctness of the decoding may be determined by cyclic redundancy check bits included with the data, for example. The feedback information may also include channel quality indicator, modulation and coding scheme (MCS), precoding matrix indicator (PMI), and rank indicator, for example. In some embodiment, channel quality indicator comprises MCS. In another embodiment, channel quality indicator comprises MCS and PMI.

Figure 9:
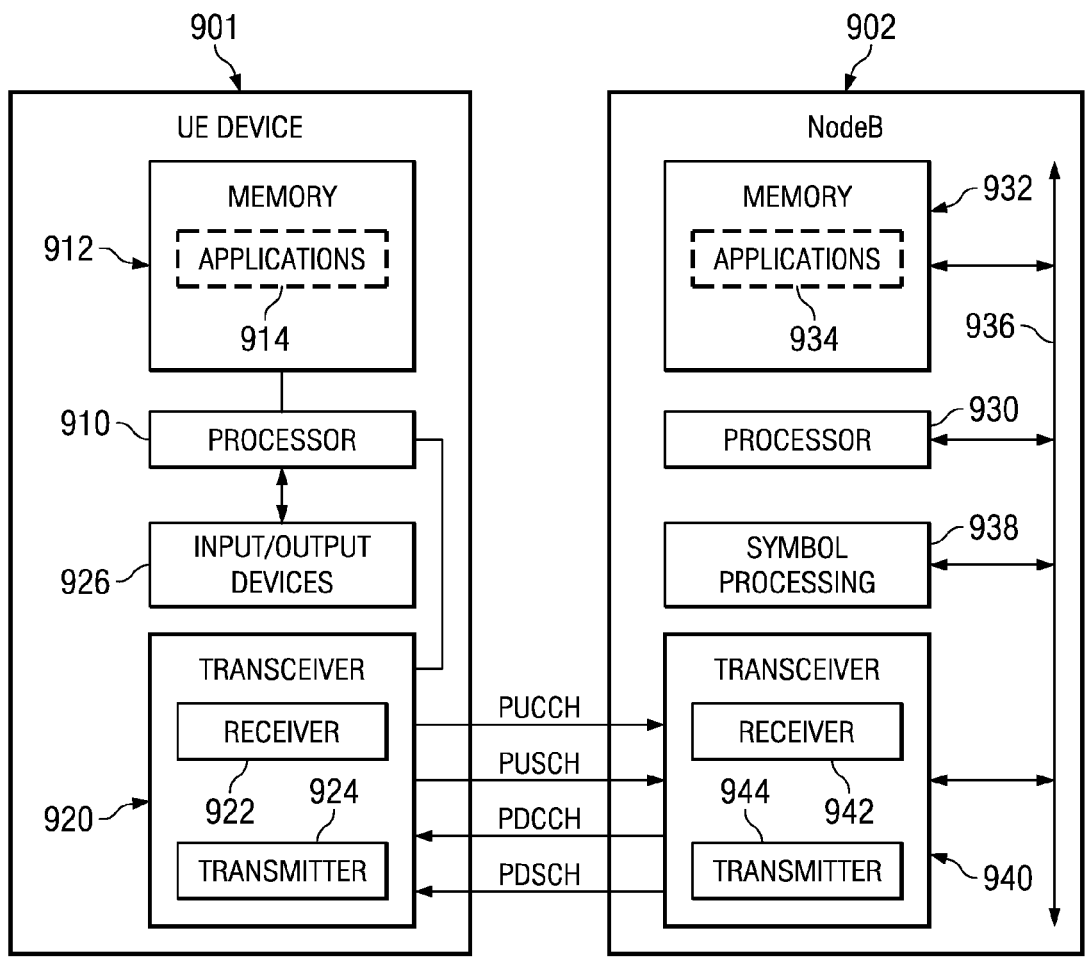
FIG. 9 is a block diagram of a Node B and a User Equipment for use in the network system of FIG. 1.

FIG. 9 is a block diagram illustrating operation of a NodeB 902 and a mobile UE 901 in the network system of FIG. 1. The mobile UE device 901 may represent any of a variety of devices such as a server, a desktop computer, a laptop computer, a cellular phone, a Personal Digital Assistant (PDA), a smart phone or other electronic devices. In some embodiments, the electronic mobile UE device 901 communicates with the NodeB 902 based on a LTE or E-UTRAN protocol. Alternatively, another communication protocol now known or later developed can be used.

As shown, the mobile UE device 901 comprises a processor 910 coupled to a memory 912 and a Transceiver 920. The memory 912 stores (software) applications 914 for execution by the processor 910. The applications could comprise any known or future application useful for individuals or organizations. As an example, such applications could be categorized as operating systems (OS), device drivers, databases, multimedia tools, presentation tools, Internet browsers, e-mailers, Voice-Over-Internet Protocol (VOIP) tools, file browsers, firewalls, instant messaging, finance tools, games, word processors or other categories. Regardless of the exact nature of the applications, at least some of the applications may direct the mobile UE device 901 to transmit UL signals to the NodeB (base-station) 902 periodically or continuously via the transceiver 920. In at least some embodiments, the mobile UE device 901 identifies a Quality of Service (QoS) requirement when requesting an uplink resource from the NodeB 902. In some cases, the QoS requirement may be implicitly derived by the NodeB 902 from the type of traffic supported by the mobile UE device 901. As an example, VOIP and gaming applications often involve low-latency uplink (UL) transmissions while High Throughput (HTP)/Hypertext Transmission Protocol (HTTP) traffic can involve high-latency uplink transmissions.

Transceiver 920 includes uplink logic which may be implemented by execution of instructions that control the operation of the transceiver. Some of these instructions may be stored in memory 912 and executed when needed by processor 910. As would be understood by one of skill in the art, the components of the Uplink Logic may involve the physical (PHY) layer and/or the Media Access Control (MAC) layer of the transceiver 920. Transceiver 920 includes one or more receivers 922 and one or more transmitters 924.

Processor 910 may send or receive data to various input/output devices 926. A subscriber identity module (SIM) card stores and retrieves information used for making calls via the cellular system. A Bluetooth baseband unit may be provided for wireless connection to a microphone and headset for sending and receiving voice data. Processor 910 may send information to a display unit for interaction with a user of the mobile UE during a call process. The display may also display pictures received from the network, from a local camera, or from other sources such as a USB connector. Processor 910 may also send a video stream to the display that is received from various sources such as the cellular network via RF transceiver 922 or the camera. It should be understood that UE 901 may contain more than one processor and that processor 910 is therefore representative of processing circuitry that may be embodied to perform the functions described herein.

During transmission and reception of voice data or other application data, transmitter 924 sends ACKNAK information via the PUCCH and/or the PUSCH links to the serving NodeB 902, as described in more detail above. In particular, transmission of simultaneous ACK/NAK and CQI can be done on PUCCH (which is the uplink control channel in 3GPP LTE). Alternatively, NodeB 902 may send a trigger to UE 901 via an uplink grant to send CQI and ACK/NAK together on PUSCH, which is the uplink data channel in 3GPP LTE.

In other words, NodeB 902 can reroute simultaneous ACK/NAK and CQI report on PUCCH to aperiodic ACK/NAK and CQI reporting on PUSCH. UE 901 will then respond accordingly by sending a CQI and ACK/NAK report via the allocated resource on PUSCH. The CQI and/or ACK/NAK report can be alone or multiplexed with uplink data from UE 901. The timing offset between the NodeB transmission of the trigger and the UE report is fixed according to a specified timing offset between a specified UL grant transmission and a UE response. For LTE, the offset is specified to be four sub-frames.

In this embodiment, the ACKNAK and/or CQI rerouting scheme embodied by executing instructions stored in memory 912 by processor 910. In other embodiments, the rerouting scheme may be embodied by a separate processor/memory unit, by a hardwired state machine, or by other types of control logic, for example.

The rerouted ACK/NAK and/or CQI onto PUSCH is then transmitted by transmitter 924, as described in more detail with regard to FIGS. 4-7.

NodeB 902 comprises a Processor 930 coupled to a memory 932, symbol processing circuitry 938, and a transceiver 940 via backplane bus 936. The memory stores applications 934 for execution by processor 930. The applications could comprise any known or future application useful for managing wireless communications. At least some of the applications 934 may direct the base-station to manage transmissions to or from the user device 901.

Transceiver 940 comprises an uplink Resource Manager, which enables the NodeB 902 to selectively allocate uplink PUSCH resources to the user device 901. As would be understood by one of skill in the art, the components of the uplink resource manager may involve the physical (PHY) layer and/or the Media Access Control (MAC) layer of the transceiver 940. Transceiver 940 includes a Receiver(s) 942 for receiving transmissions from various UE within range of the NodeB and transmitter(s) 944 for transmitting data and control information to the various UE within range of the NodeB.

The uplink resource manager executes instructions that control the operation of transceiver 940. Some of these instructions may be located in memory 932 and executed when needed on processor 930. The resource manager controls the transmission resources allocated to each UE that is being served by NodeB 902 and broadcasts control information via the physical downlink control channel PDCCH.

Symbol processing circuitry 938 performs demodulation and reverse rate matching using known techniques. ACK-NAK and/or CQI information received from UE 901 is demodulated using an agreed upon transmission scheme controlled by a trigger signal from NodeB 902 as described in more detail above.

OTHER EMBODIMENTS

While the invention has been described with reference to illustrative embodiments, this description is not intended to be construed in a limiting sense. Various other embodiments of the invention will be apparent to persons skilled in the art upon reference to this description. For example, a larger or smaller number of symbols then described herein may be used in a slot.

In another embodiment the size of a resource block and the resultant number of potential resource elements per resource block may be increased or decreased.

When the CQI and/or ACK/NAK is sent without an accompanying data, a smaller UL grant can be used, instead of the UL grant corresponding to the regular UL allocation for data transmission. A possibility is to use the UL grant corresponding to D-BCH, RACH response, and/or paging.

Alternatively, this scheme can be extended to the joint/simultaneous report of CQI, ACK/NAK, and rank report. Here, CQI may include precoding matrix indicator (PMI). That is, the joint report (whenever occurring) is rerouted from PUCCH to PUSCH via triggered-based aperiodic reporting. In this case, the UL grant may contain some indicator of the types of reports that need to be sent by the UE. Alternatively, the indicator may not be needed since the UE knows what type of reports the UE needs to feed back at a given sub-frame.

As used herein, the terms "applied," "coupled," "connected," and "connection" mean electrically connected, including where additional elements may be in the electrical connection path. "Associated" means a controlling relationship, such as a memory resource that is controlled by an associated port.

It is therefore contemplated that the appended claims will cover any such modifications of the embodiments as fall within the true scope and spirit of the invention.

What is claimed is:

1. A method for operating a user equipment in a wireless communication system, comprising:

receiving at the user equipment an allocation of resources comprising a plurality of resource elements on an uplink shared data channel;

generating feedback information at the user equipment comprising generating a first type of feedback information and a second type of feedback information;

transmitting the first type of feedback information using a first subset of the allocated resource elements on the uplink shared data channel when a trigger has been received;

transmitting the second type of feedback information using a second subset of the allocated resource elements on the uplink shared data channel when the trigger has been received, wherein the second subset is different than the first subset; and transmitting the feedback information on an uplink control channel when no trigger has been received.

2. The method of claim 1, wherein the feedback information is the only information transmitted on the allocated resources of the uplink shared data channel.

3. The method of claim 1, wherein the first type of feedback information and the second type of feedback information is the only information transmitted on the allocated resources of the uplink shared data channel.

4. The method of claim 1, further comprises:

generating a third type of feedback information; and transmitting the third type of feedback information using a third subset of the allocated resource elements on the uplink shared data channel.

5. A user equipment apparatus for use in a wireless communication system, comprising:

processing circuitry coupled to receiver circuitry and to transmitter circuitry;

the receiver circuitry operable to receive from a base station an allocation of resources comprising a plurality of resource elements on an uplink shared data channel;

the processing circuitry operable to generate feedback information comprising generating a first type of feedback information and generating a second type of feedback information;

the transmitter circuitry operable to transmit the first type of feedback information using a first subset of the allocated resource elements on the uplink shared data channel when a trigger has been received;

the transmitter circuitry operable to transmit the second type of feedback information using a second subset of the allocated resource elements on the uplink shared data channel when the trigger has been received, wherein the second subset is different than the first subset, and the transmitter circuitry operable to transmit the feedback information on an uplink control channel when no trigger has been received.

6. The apparatus of claim 5, wherein the feedback information is the only information transmitted on the allocated resources of the uplink shared data channel.

7. The apparatus of claim 5 being a cellular telephone.

8. A method for operating in a wireless communication system including a base station and at least one user equipment, comprising:

transmitting an allocation of resources in the communication system comprising a plurality of resource elements on an uplink shared data channel from the base station to a user equipment;

optionally transmitting a trigger from the base station to a user equipment;

receiving a first type of feedback information on a first subset of the allocated resource elements on the uplink shared data channel when a trigger was transmitted;

receiving a second type of feedback information using a second subset of the allocated resource elements on the uplink shared data channel when the trigger was transmitted, wherein the second subset is different than the first subset, and transmitting the feedback information on an uplink control channel when no trigger was transmitted.

9. The method of claim 8, wherein the first type of feedback information and the second type of feedback information is the only information received on the allocated resources of the uplink shared data channel.

10. A method for operating a user equipment in a wireless communication system, comprising:

receiving at the user equipment an allocation of resources comprising a plurality of resource elements on an uplink shared data channel;

generating feedback information at the user equipment;

transmitting the feedback information using a subset of the allocated resource elements on the uplink shared data channel if a trigger has been received, and transmitting the feedback information on an uplink control channel if a trigger has not been received.

11. The method of claim 10, wherein the feedback information is the only information transmitted on the allocated resources of the uplink shared data channel.

12. The method of claim 10, wherein the feedback information comprises:

a first type of feedback information transmitted using a first subset of the allocated resource elements on the uplink shared data channel; and a second type of feedback information using a second subset of the allocated resource elements on the uplink shared data channel, wherein the second subset is different from the first subset.

13. A user equipment apparatus for use in a wireless communication system, comprising:

processing circuitry coupled to receiver circuitry and to transmitter circuitry;

the receiver circuitry operable to receive from a base station an allocation of resources comprising a plurality of resource elements on an uplink shared data channel and to determine whether a trigger signal has been received;

the processing circuitry operable to generate feedback information;

the transmitter circuitry operable to transmit the feedback information using a subset of the allocated resource elements on the uplink shared data channel if a trigger has been received; and the transmitter circuitry operable to transmit the feedback information using an uplink control channel if a trigger has not been received.

14. The apparatus of claim 13, wherein the feedback information is the only information transmitted on the allocated resources of the uplink shared data channel.

15. The apparatus of claim 13, wherein the feedback information comprises:

a first type of feedback information transmitted using a first subset of the allocated resource elements on the uplink shared data channel; and a second type of feedback information using a second subset of the allocated resource elements on the uplink shared data channel, wherein the second subset is different from the first subset.

16. A method for operating a wireless communication system including a base station and at least one user equipment, comprising:

transmitting an allocation of resources in the communication system comprising a plurality of resource elements on an uplink shared data channel from the base station to a user equipment;

optionally transmitting a trigger;

receiving feedback information using a subset of the allocated resource elements on the uplink shared data channel if a trigger was transmitted; and receiving feedback information using an uplink control channel if a trigger was not transmitted.

17. The method of claim 16, wherein the feedback information is the only information received from the user equipment on the allocated resources of the uplink shared data channel.

18. The method of claim 16, wherein the feedback information comprises:

a first type of feedback information transmitted using a first subset of the allocated resource elements on the uplink shared data channel; and a second type of feedback information using a second subset of the allocated resource elements on the uplink shared data channel, wherein the second subset is different from the first subset.

* * * * *